(12) United States Patent  
Riehle

(10) Patent No.: US 7,635,235 B2
(45) Date of Patent: Dec. 22, 2009

(54) WORM SHAFT COUPLING

(75) Inventor: Ralf Riehle, Dusslingen (DE)

(73) Assignee: Coperion GmbH, Stuttgart (DE)

( * ) Notice: Subject to any disclaimer, the term of this patent is extended or adjusted under 35 U.S.C. 154(b) by 127 days.

(21) Appl. No.: 11/681,552

(22) Filed: Mar. 2, 2007

(65) Prior Publication Data

US 2008/0016982 A1 Jan. 24, 2008

(30) Foreign Application Priority Data

Mar. 4, 2006 (EP) .................................. 06004425

(51) Int. Cl.
*F16D 1/108* (2006.01)
(52) U.S. Cl. .................. 403/359.5; 403/286; 403/325; 403/348
(58) Field of Classification Search .............. 403/292, 403/293, 298, 286, 321, 322.1, 325, 348, 403/349, 359.1, 359.2, 359.3, 359.4, 359.5, 403/359.6; 464/182, 901
See application file for complete search history.

(56) References Cited

U.S. PATENT DOCUMENTS

| | | | | |
|---|---|---|---|---|
| 2,067,377 A | * | 1/1937 | Burns et al. | .................. 464/182 |
| 2,821,277 A | * | 1/1958 | Hughes | .................... 403/359.5 |
| 3,929,343 A | * | 12/1975 | Wanner et al. | ............... 403/349 |
| 4,344,305 A | * | 8/1982 | Holmes | .................... 403/359.5 |
| 4,392,759 A | * | 7/1983 | Cook | ....................... 403/359.3 |
| 4,523,871 A | * | 6/1985 | Recker | ..................... 403/359.5 |
| 4,527,899 A | | 7/1985 | Blach et al. | |
| 4,936,702 A | * | 6/1990 | Hsu | ............................ 403/348 |
| 4,943,182 A | | 7/1990 | Hoblingre | |
| 5,874,682 A | | 2/1999 | Schafer et al. | |
| 6,470,560 B1 | | 10/2002 | Wanner et al. | |

FOREIGN PATENT DOCUMENTS

EP    0668414    12/1994

OTHER PUBLICATIONS

Search report from Parent EU case 06004425.

* cited by examiner

*Primary Examiner*—Michael P Ferguson
(74) *Attorney, Agent, or Firm*—James B. Conte

(57) ABSTRACT

A worm shaft coupling for connecting a driven shaft of a transmission mechanism and a coaxially arranged worm shaft of an extruder has a coupling sleeve which connects two coupling pegs in a torque-proof manner and is, in turn axially secured using threaded sleeves. The internal thread of the threaded sleeve facing the worm shaft of the extruder and the associated external thread of the coupling sleeve have recesses allowing the threaded sleeve and the coupling sleeve to be connected in the manner of a bayonet fixing.

12 Claims, 5 Drawing Sheets

WORM SHAFT COUPLING

BACKGROUND OF THE INVENTION

Field of the Invention

The invention relates to a worm shaft coupling for connecting a driven shaft of a transmission mechanism and a coaxially arranged worm shaft of an extruder with a coupling peg, associated with the worm shaft, of the driven shaft, with a coupling peg, facing the coupling peg of the driven shaft, of the worm shaft, with a coupling sleeve receiving the coupling peg and connecting them with rotational engagement by means of longitudinal teeth, with a threaded sleeve which rigidly connects the coupling sleeve to the driven shaft in the longitudinal direction thereof and is screwed, by means of an internal thread, to an external thread of the coupling sleeve and with a threaded sleeve which rigidly connects the coupling sleeve to the worm shaft in the longitudinal direction of the worm shaft and is screwed, by means of an internal thread having a thread root to an external thread, having a thread root, of the coupling sleeve. The couplings are, in particular, worm shaft couplings between a plurality of driven shafts of a distributor transmission mechanism and the worm shafts, arranged coaxially therewith, of a multiple-shaft extruder.

In multiple-shaft extruders, in particular two-shaft extruders, the axial distance between the worm shafts is defined by the geometry of the extruder As the external diameter of each worm shaft coupling has to be slightly smaller than the aforementioned axial distance, there is very little space between the transmission mechanism and the extruder for detaching or reassembling the coupling. This is further intensified by the fact that there is arranged between the distributor transmission mechanism and extruder what is known as a lantern, i.e. a cage-like connection of the transmission mechanism and extruder, ensuring alignment of the shafts. In the generically assumed worm shaft couplings, the two threaded sleeves are each connected to the coupling sleeve using fine threads, so detaching a coupling of this type is highly labour-intensive and requires the threaded sleeve to be unscrewed.

SUMMARY OF THE INVENTION

The object of the invention is therefore to develop a worm shaft coupling of the generic type in such a way that the opening or detaching of the coupling and the reconnecting of the driven shaft to the worm shaft are carried out much more easily and rapidly.

In a worm shaft coupling with a coupling peg, associated with the worm shaft, of the driven shaft, with a coupling peg, facing the coupling peg of the driven shaft, of the worm shaft, with a coupling sleeve receiving the coupling pegs and connecting them with rotational engagement by means of longitudinal teeth, with a threaded sleeve which rigidly connects the coupling sleeve to the driven shaft in the longitudinal direction thereof and is screwed, by means of an internal thread, to an external thread of the coupling sleeve and with a threaded sleeve which rigidly connects the coupling sleeve to the worm shaft in the longitudinal direction of the worm shaft and is screwed, by means of an internal thread having a thread root, to an external thread, having a thread root, of the coupling sleeve, this object is achieved by the external thread, facing the worm shaft, of the coupling sleeve and the internal thread of the threaded sleeve arranged thereon are each provided, in alternation, with recesses extending over identical circumferential angles α and threaded portions, the recesses extending radially to the axis down to the thread root.

The measures according to the invention produce, as it were, a bayonet fixing between the worm shaft and the coupling sleeve. Detaching or producing the connection requires merely twisting of the threaded sleeve through a fraction of a revolution, i.e. at most 90°.

Additional anti-twist means effectively prevent detachment of the coupling connections owing to vibrations.

Further features, advantages and details of the invention will emerge from the following description of an embodiment with reference to the drawing

DESCRIPTION OF THE PREFERRED EMBODIMENT

Figure 1:
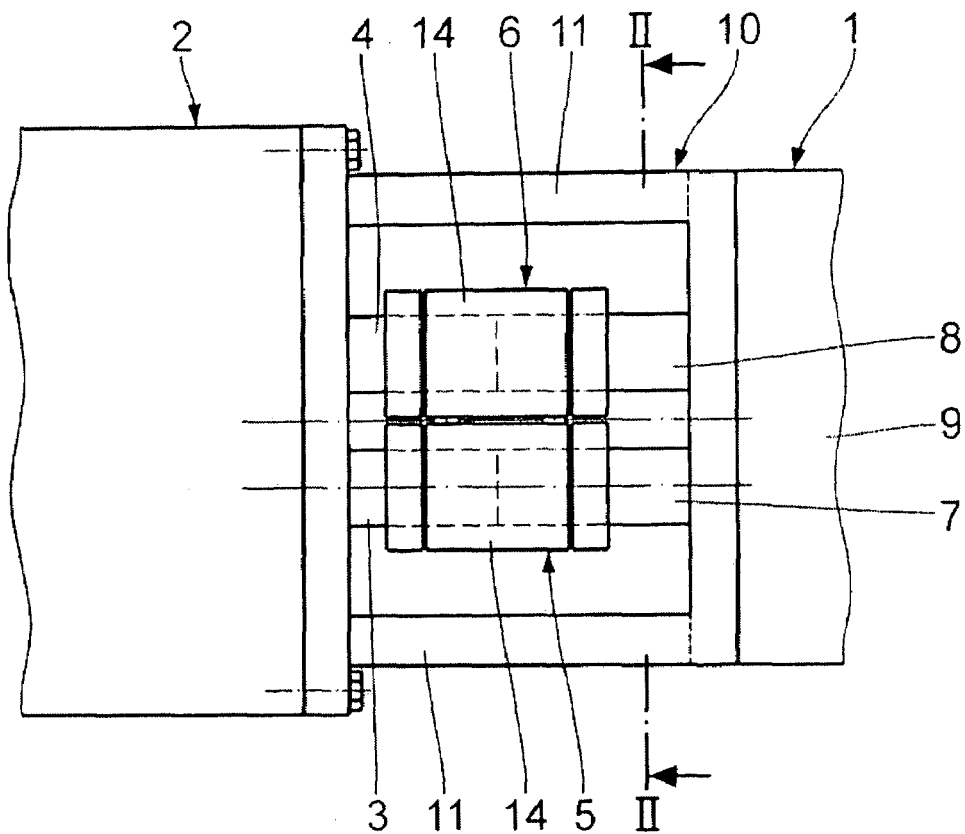
FIG. 1 shows a plan view of a worm shaft coupling arranged between distributor transmission mechanism and a two-worm extruder.
Figure 2:
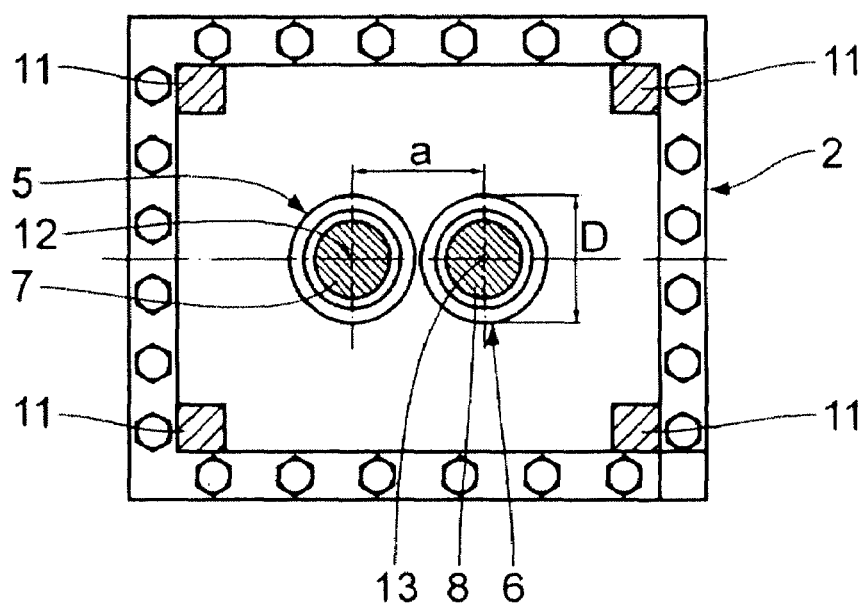
FIG. 2 shows a cross-section through FIG. 1, corresponding to the section line II-II in FIG. 1.
Figure 3:
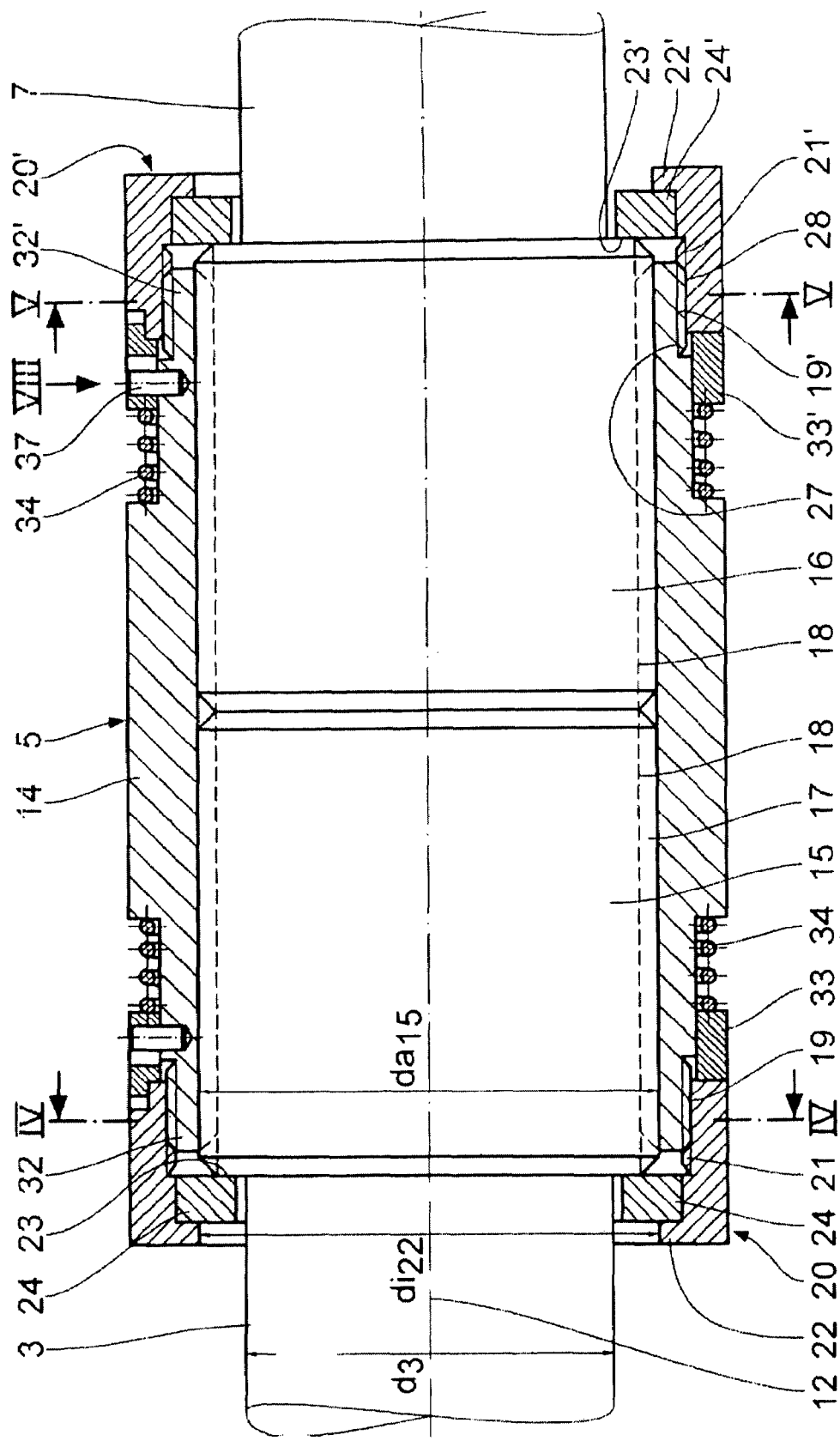
FIG. 3 shows an enlarged view, compared to FIG. 1 and 2, of a longitudinal section through a worm shaft coupling.
Figure 5:
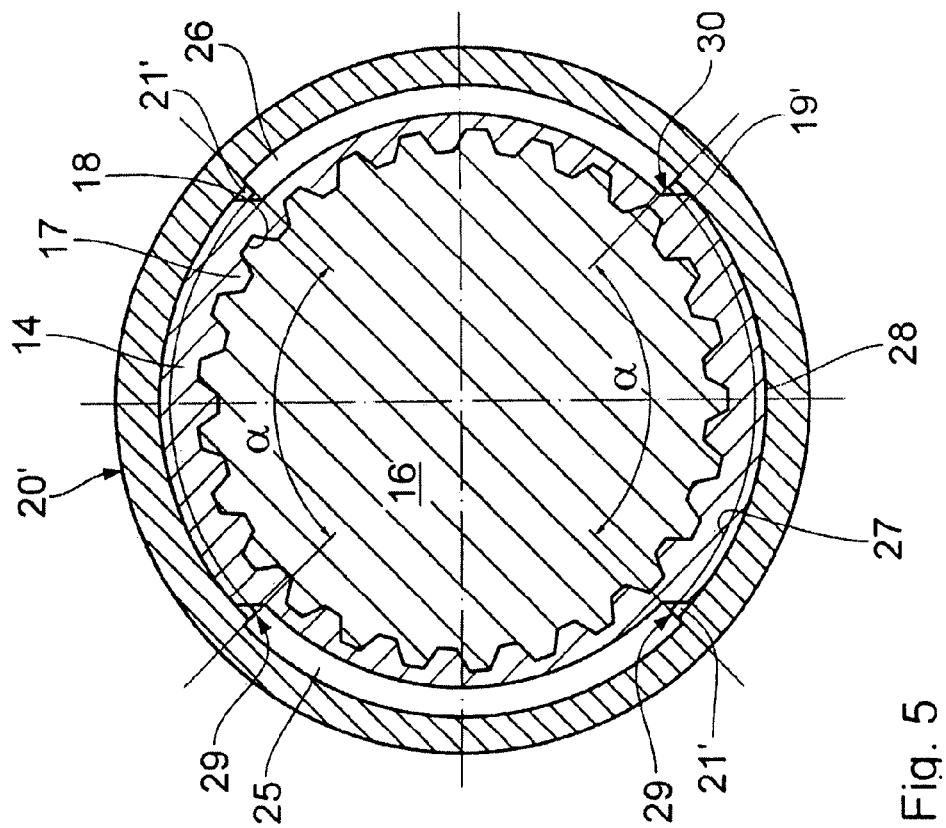
FIG. 5 shows a further cross-section through the worm shaft coupling, corresponding to the section line V-V in FIG. 3.
Figure 4:
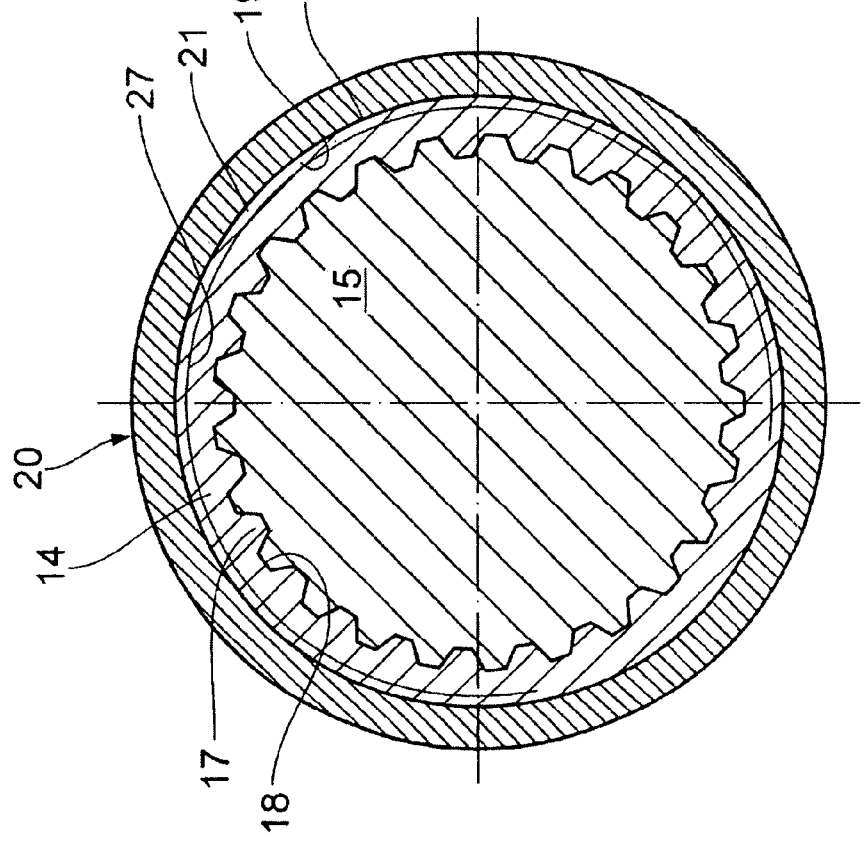
FIG. 4 shows a cross-section through the worm shaft coupling, corresponding to the section line IV-IV in FIG. 3.
Figure 7:
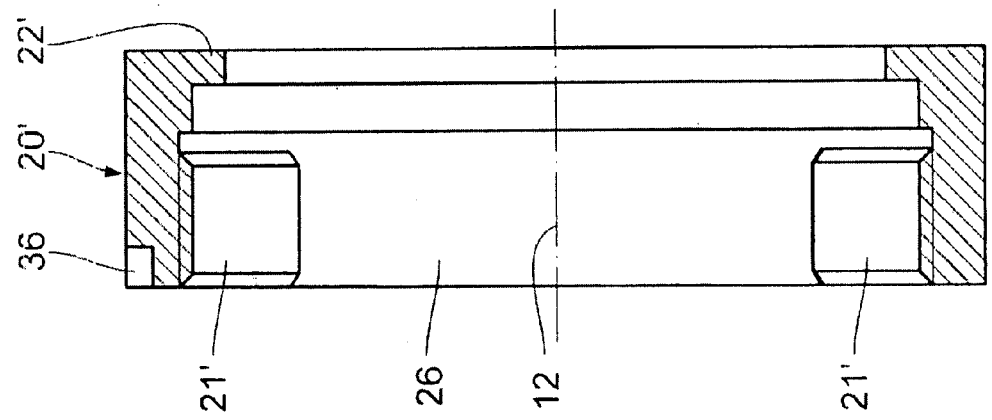
FIG. 7 shows a longitudinal section through the threaded sleeve along the section line VII-VII in FIG. 6.
Figure 6:
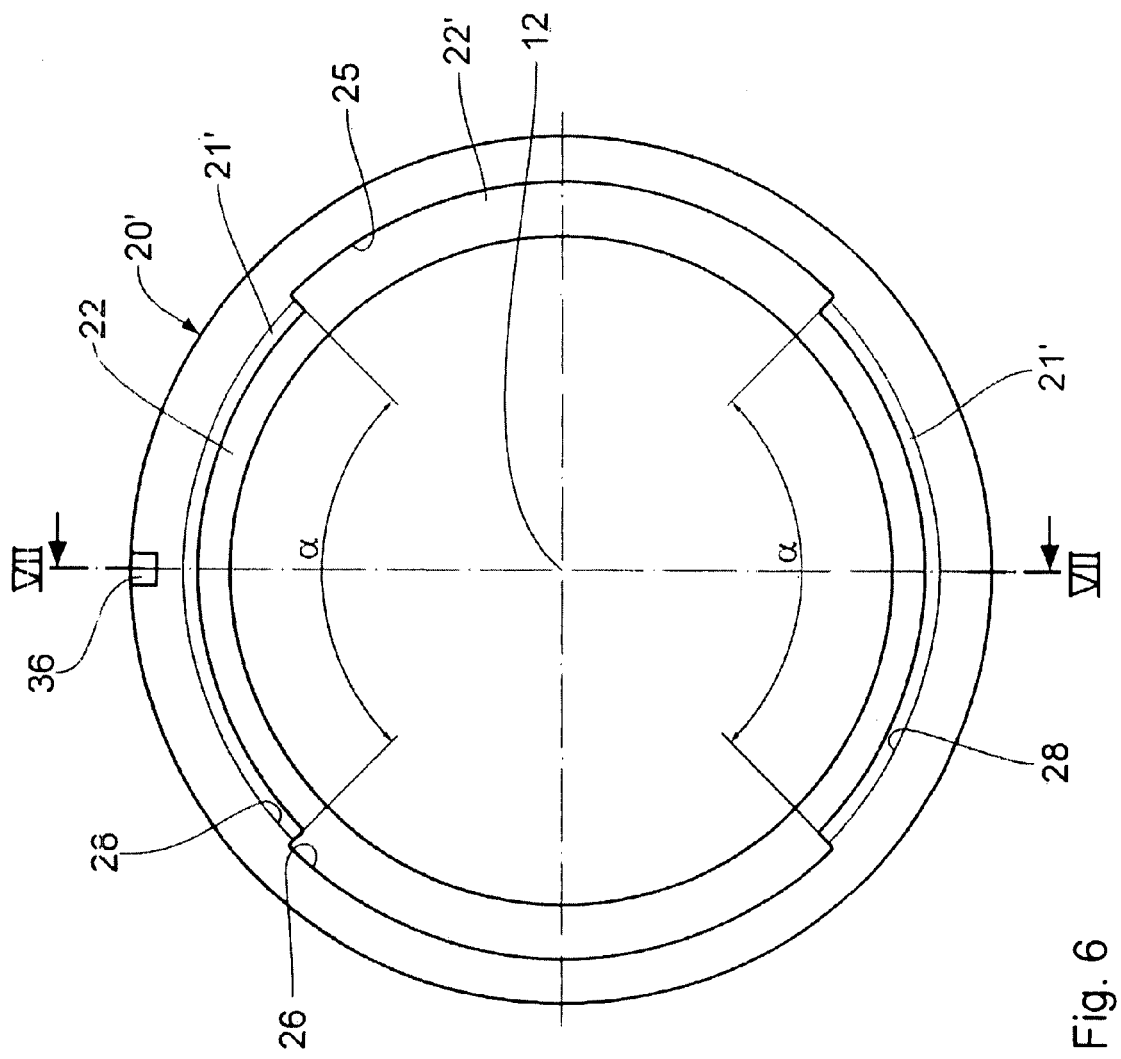
FIG. 6 shows a front view of a threaded sleeve associated with the worm shaft.

As indicated in FIGS. 1 and 2, an extruder 1, which is a two or multiple-shaft extruder 1, is driven by a motor (not shown) via a distributor transmission mechanism 2. For this purpose, driven shafts 3, 4 of the distributor transmission mechanism 2 are connected to the worm shafts 7, 8 of the extruder 1, so as to transmit torque, using worm shaft couplings 5, 6. The distributor transmission mechanism 2 and the housing 9 of the extruder 1 are connected using what is known as a lantern 10 which can be formed by rods 11 between which there is little free space for opening or closing the couplings 5, 6. As also shown in FIG. 1, the distance a between the axes 12, 13 of the worm shafts 7, 8 is determined based on the geometry of the extruder 1. The external diameter D of the couplings 5, 6 is therefore also predetermined; it must, in any case, be slightly smaller than the distance a so as to prevent the two worm shaft couplings 5, 6 from entering into contact. The worm shaft couplings 5, 6, of which only one worm shaft coupling 5 will be illustrated and described hereinafter but which are entirely identical, have a coupling sleeve 14 receiving a coupling peg 15 of the driven shaft 3 and a coupling peg 16 of the worm shaft 77 respectively, as may be seen in particular in FIG. 3. Both the coupling sleeve 14 and the coupling pegs 15, 16 have longitudinal teeth 17 and 18, respectively, allowing torque-proof connection of the driven shaft 3 to the worm shaft 7 via the coupling sleeve 14.

On the side facing the distributor transmission mechanism 2, the coupling sleeve 14 has an external thread 19 which is in the form of a fine thread and to which there is screwed a threaded sleeve 20 having a corresponding internal thread 21. The threaded sleeve 20 has an annular collar 22 which projects radially inwardly, i.e. toward the axis 12, and the internal diameter di22 of which is larger than the external diameter da15 of the coupling peg 15. This external diameter da15 is, in turn, larger than the diameter d3 of the driven shaft 3, thus forming all end stop face 23 between the driven shaft 3 and the coupling peg 15. Between the annular collar 22 and the stop face 23 there is arranged a two-part ring 24 which abuts both the annular collar 22 and the stop face 23, thus causing fixing of the coupling sleeve 14 relative to the driven shaft 3 in the direction of the axis 12. This embodiment corresponds, to the described extent, to the generally conventional prior art.

On the side facing the extruder 1, the coupling sleeve 14 is connected to the worm shaft 7 in a very similar manner, so all identical or almost identical parts are denoted by the same reference numerals as on the side facing the distributor transmission mechanism 2. For the sake of distinction, they are each provided with an apostrophe.

A fundamental difference is that the external thread 19' of the coupling sleeve 14 and the internal thread of the threaded sleeve 20' are each provided with recesses 25 and 26, respectively, which extend down to below each thread root 27 and 28 respectively. The recesses 25 and 26 each extend over identical angular portions a to the threaded portions 29 and 30, respectively, which have not been removed, for example by milling, i.e. those portions that have remained at the same location, on the threaded sleeve 20' and the coupling sleeve 14 respectively. In the illustrated embodiment, the angle α is 90°, so once the threaded sleeve 20' has been pushed onto the coupling sleeve 14, rotation of the threaded sleeve 20' through the angle α, through for example 90°, is sufficient to produce a connection, rigid in the direction of the axis 12, between the coupling sleeve 14 and the threaded sleeve 20' and thus, via the two-part ring 24', between the coupling sleeve 14 and the coupling peg 15 of the worm shaft 7. The connection is detached by corresponding rotation through the angle α in the opposite direction. The internal thread 21' and the external thread 19' can obviously also be replaced by corresponding uninclined annular profiles, so twisting through the angle α, when producing or detaching the connection, does not cause relative axial movement between the threaded sleeve 20' and coupling sleeve 14.

Figure 8:
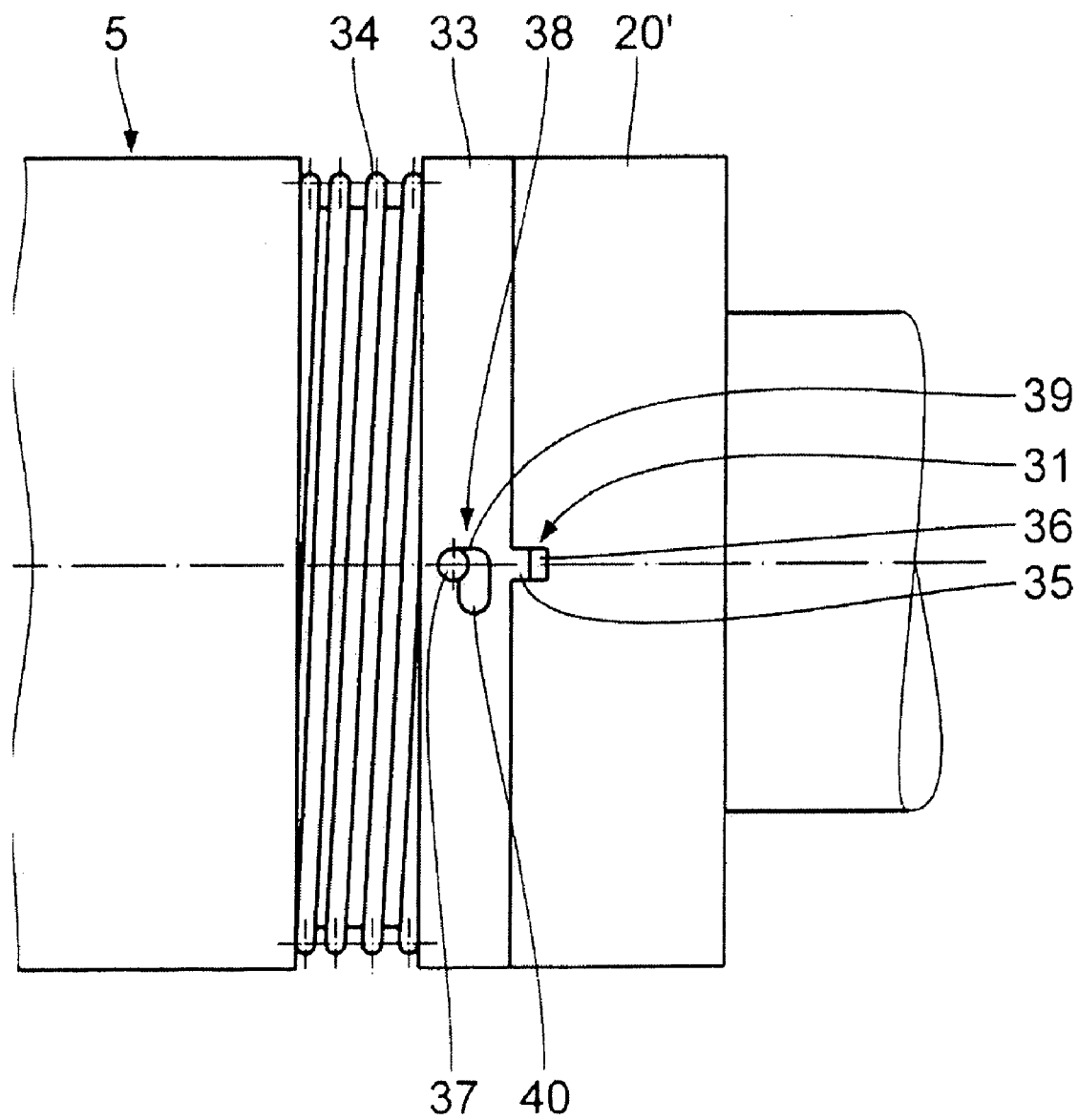
FIG. 8 shows a plan view of the worm shaft coupling, corresponding to the arrow VIII in FIG. 3.

The two threaded sleeves 20, 20' are prevented from twisting by two identical anti-twist means 31 which are identical in their construction, so they do not have to be redescribed. On the tapered coupling sleeve portion 32 or 32', carrying the respective external threads 19 and 19', of the coupling sleeve 14 there is arranged a retaining ring 33 which is pressed toward each threaded sleeve 20 and 20', respectively, using a biased helical compression spring 34. The retaining ring carries, on the side facing each threaded sleeve 20, 20', a locking projection 35 which engages, in the retained position shown in the drawings, with a corresponding locking recess 36 on the threaded sleeve 20 or 20'. The retaining ring 33 itself, for its part, is prevented from twisting by a retaining pin 37 which is screwed into the sleeve portion 32 or 32' and penetrates an angular groove 38 in the retaining ring 33, as may be seen in particular in FIG. 8. This angular groove 38 has a first groove leg 39 which extends in the direction of the axis 12 and in which the retaining pin 37 is in the locking position shown in the drawings. The angular groove 38 also has a second groove leg 40 which extends perpendicularly to the groove leg 39 and with which the retaining pin 37 engages once the retaining ring 33 has been displaced, relative to the threaded sleeve 20 or 20', sufficiently fir in the direction of the axis 12 for the locking projection 35 to become disengaged from the locking recess 36. The retaining ring 33 can then be twisted sufficiently far for it to be held in a position free from the threaded sleeve 20 or 20', i.e. it is no longer pressed against said sleeve.

If, for example, the worm shafts 7, 8 of the extruder I are to be extended, each worm shaft coupling 5 or 6 has to be detached. For this purpose, the two retaining rings 33 are first raised from the threaded sleeve 20 or 20', using a suitable tool for detaching the connection between the locking projection 35 and locking recess 36, in the direction of the axis 12, counter to the pressure of the spring 34 of the threaded sleeve 20 or 20', and held, by slight twisting, in their raised position in which the retaining pin 37 engages with the second groove leg 40. If the bias between the two coupling pegs 15, 16 of the coupling sleeve 14 is still too great, the threaded sleeve 20 is twisted slightly on the side adjacent to the distributor transmission mechanism 2, thus cancelling the internal bias-caused by the abutment of the coupling pegs 15, 16. The threaded sleeve 20' is then twisted through the angle α, causing the threaded portions 29 to enter the recess 26 and the threaded portions 30 to enter the recess 25, so the threaded sleeve 20' can be withdrawn from the coupling sleeve 14. The two-part ring 24' can be removed. The threaded sleeve 20' can be stripped on withdrawal of the worm shaft 7 via the coupling peg 15. The connection between the driver shaft 3 and worm shaft 7 is produced in the opposite order once the worm shaft 7 has been reinserted.

What is claimed is:

1. A worm shaft coupling for connecting a driven shaft of a transmission mechanism and a coaxially arranged worm shaft of an extruder, the worm shaft coupling having:
   a driven shaft coupling peg,
   a worm shaft coupling peg, facing the driven shaft coupling peg,
   a coupling sleeve receiving the driven shaft and worm shaft coupling pegs and connecting them with rotational engagement by means of longitudinal teeth,
   a first threaded sleeve to rigidly connect the coupling sleeve to the driven shaft in a longitudinal direction thereof,
   said first threaded sleeve having a first internal thread that is screwed to a first external thread of the coupling sleeve,
   a second threaded sleeve to rigidly connect the coupling sleeve to the worm shaft in a longitudinal direction thereof, said second threaded sleeve having a second internal thread that is screwed to a second external thread of the coupling sleeve, the second internal thread has a first thread root and the second external thread has a second thread root, wherein the second external thread of the coupling sleeve is provided, in alternation, with first recesses and first threaded portions, the first recesses and the first threaded portions each extending over identical circumferential angles α and each of the first recesses extending radially to an axis of the worm shaft inwardly to the second thread root,
   wherein the second internal thread of the second threaded sleeve is provided, in alternation, with second recesses and second threaded portions, each extending over said identical circumferential angles α, and each of the second recesses extending radially to the axis outwardly to the first thread root,
   wherein an anti-twisting means is associated with the first and second threaded sleeves for preventing twisting of the threaded sleeves,
   wherein each anti-twisting means comprises a retaining ring arranged on the coupling sleeve, a rotationally engaged connection being formed between the retaining ring and one of the threaded sleeves by a recess and a locking projection engaging therewith, wherein in a position locked to a respective threaded sleeve, the respective retaining ring is secured to the coupling sleeve so as to prevent twisting of the threaded sleeves, and wherein the coupling sleeve is provided with a retaining pin which engages with an angular groove in the retaining ring, wherein the angular groove comprises a first groove leg which extends in the direction of the axis and a second groove leg which extends perpendicular to the first groove leg and wherein the retaining pin is engaged in said first groove leg.

2. A worm shaft coupling according to claim 1, wherein for the circumferential angle $\alpha$, the following applies: $\alpha=90°$.

3. A worm shaft coupling according to claim 1 wherein each retaining ring is pressed against one of the threaded sleeves by means of a compression spring.

4. A worm shaft coupling for connecting a driven shaft of a transmission mechanism and a coaxially arranged worm shaft of an extruder, the worm shaft coupling having:
a driven shaft coupling peg,
a worm shaft coupling peg, facing the driven shaft coupling peg,
a coupling sleeve receiving the driven shaft and worm shaft coupling pegs and connecting them with rotational engagement by means of longitudinal teeth,
a first threaded sleeve to rigidly connect the coupling sleeve to the driven shaft in a longitudinal direction thereof,
said first threaded sleeve having a first internal thread that is screwed to a first external thread of the coupling sleeve,
a second threaded sleeve to rigidly connect the coupling sleeve to the worm shaft in a longitudinal direction thereof, said second threaded sleeve having a second internal thread that is screwed to a second external thread of the coupling sleeve, the second internal thread has a first thread root and the second external thread has a second thread root,
wherein the second external thread of the coupling sleeve is provided, in alternation, with first recesses and first threaded portions, the first recesses and the first threaded portions each extending over identical circumferential angles $\alpha$ and each of the first recesses extending radially to an axis of the worm shaft inwardly to the second thread root,
wherein the second internal thread of the second threaded sleeve is provided, in alternation, with second recesses and second threaded portions, each extending over said identical circumferential angles $\alpha$, and each of the second recesses extending radially to the axis outwardly to the first thread root,
wherein an anti-twisting means is associated with the first and second threaded sleeves for preventing twisting of the threaded sleeves wherein each anti-twisting means comprises a retaining ring arranged on the coupling sleeve, a rotationally engaged connection being formed between the retaining ring and one of the threaded sleeves by a recess and a locking projection engaging therewith,
wherein in an unlocked position axially displaced from the threaded sleeve, the retaining ring is secured so as to be non-displaceable in the longitudinal direction of the worm shaft, and
wherein the coupling sleeve is provided with a retaining pin which engages with an angular groove in the retaining ring, wherein the angular groove comprises a first groove leg which extends in the direction of the axis and a second groove leg which extends perpendicular to the first groove leg and wherein the retaining pin is engaged in the second groove leg.

5. A worm shaft coupling according to claim 4, wherein for the circumferential angle $\alpha$, the following applies: $\alpha=90°$.

6. A worm shaft coupling according to claim 4 wherein each retaining ring is pressed against one of the threaded sleeves by means of a compression spring.

7. An assembly containing a driven shaft of a transmission mechanism and a coaxially arranged extruder worm shaft with the driven shaft and the extruder worm shaft being joined by a worm shaft coupling with the worm shaft coupling having:
a driven shaft coupling peg,
a worm shaft coupling peg, facing the driven shaft coupling peg,
a coupling sleeve receiving the driven shaft and worm shaft coupling pegs and connecting them with rotational engagement by means of longitudinal teeth,
a first threaded sleeve to rigidly connect the coupling sleeve to the driven shaft in a longitudinal direction thereof,
said first threaded sleeve having a first internal thread that is screwed to a first external thread of the coupling sleeve,
a second threaded sleeve to rigidly connect the coupling sleeve to the worm shaft in a longitudinal direction thereof, said second threaded sleeve having a second internal thread of the coupling sleeve that is screwed to a second external thread of the coupling sleeve, the second internal thread has a first thread root and the second external thread has a second thread root, wherein the second external thread of the coupling sleeve is provided, in alternation, with first recesses and first threaded portions, the first recesses and the first threaded portions each extending over identical circumferential angles $\alpha$ and each of the first recesses extending radially to an axis of the worm shaft inwardly to the second thread root,
wherein the second internal thread of the second threaded sleeve is provided, in alternation, with second recesses and second threaded portions, each extending over said identical circumferential angles $\alpha$, and each of the second recesses extending radially to the axis outwardly to the first thread root,
wherein an anti-twisting means is associated with the first and second threaded sleeves for preventing twisting of the threaded sleeves,
wherein each anti-twisting means comprises a retaining ring arranged on the coupling sleeve, a rotationally engaged connection being formed between the retaining ring and one of the threaded sleeves by a recess and a locking projection engaging therewith,
wherein in a position locked to a respective threaded sleeve, the respective retaining ring is secured to the coupling sleeve so as to prevent twisting of the threaded sleeves, and
wherein the coupling sleeve is provided with a retaining pin which engages with an angular groove in the retaining ring, wherein the angular groove comprises a groove leg which extends in the direction of the axis and a second groove leg which extends perpendicular to the first groove leg and wherein the retaining pin is engaged in said first groove leg.

8. The assembly according to claim 7, wherein for the circumferential angle $\alpha$, the following applies: $\alpha=90°$.

9. The assembly according to claim 7, wherein each retaining ring is pressed against one of threaded sleeves by means of a compression spring.

10. An assembly containing a driven shaft of a transmission mechanism and a coaxially arranged extruder worm shaft with the driven shaft and the extruder worm shaft being joined by a worm shaft coupling with the worm shaft coupling having:
- a driven shaft coupling peg,
- a worm shaft coupling peg, facing the driven shaft coupling peg,
- a coupling sleeve receiving the driven shaft and worm shaft coupling pegs and connecting them with rotational engagement by means of longitudinal teeth,
- a first threaded sleeve to rigidly connect the coupling sleeve to the driven shaft in a longitudinal direction thereof,
- said first threaded sleeve having a first internal thread that is screwed to a first external thread of the coupling sleeve,
- a second threaded sleeve to rigidly connect the coupling sleeve to the worm shaft in a longitudinal direction thereof, said second threaded sleeve having a second internal thread that is screwed to a second external thread of the coupling sleeve, the second internal thread has a first thread root and the second external thread has a second thread root,
- wherein the second external thread of the coupling sleeve is provided, in alternation, with first recesses and first threaded portions, the first recesses and the first threaded portions each extending over identical circumferential angles $\alpha$ and each of the first recesses extending radially to an axis of the worm shaft inwardly to the second thread root,
- wherein the second internal thread of the second threaded sleeve is provided, in alternation, with second recesses and second threaded portions, each extending over said identical circumferential angles $\alpha$, and each of the second recesses extending radially to the axis outwardly to the first thread root,
- wherein an anti-twisting means is associated with the first and second threaded sleeves for preventing twisting of the threaded sleeves,
- wherein each anti-twisting means comprises a retaining ring arranged on the coupling sleeve, a rotationally engaged connection being formed between the retaining ring and one of the threaded sleeves by a recess and a locking projection engaging therewith,
- wherein in an unlocked position axially displaced from the threaded sleeve, the retaining ring is secured so as to be non-displaceable in the longitudinal direction of the worm shaft, and
- wherein the coupling sleeve is provided with a retaining pin which engages with an angular groove in the retaining ring, wherein the angular groove comprises a groove leg which extends in the direction of the axis and a second groove leg which extends perpendicular to the first groove leg and wherein the retaining pin is engaged in said first groove leg.

11. The assembly according to claim 10, wherein for the circumferential angle $\alpha$, the following applies: $\alpha=90°$.

12. The assembly according to claim 10, wherein each retaining ring is pressed against one of threaded sleeves by means of a compression spring.

* * * * *